United States Patent [19]
Licata

[11] 3,816,737
[45] June 11, 1974

[54] VECTOR SUMMER CIRCUIT USING TIME SHARING

[75] Inventor: William H. Licata, Adelphi, Md.

[73] Assignee: The United States of America as represented by the Secretary of the Navy, Washington, D.C.

[22] Filed: Apr. 10, 1973

[21] Appl. No.: 349,874

[52] U.S. Cl. ................ 235/192, 235/193.5, 235/194
[51] Int. Cl. ....... G06g 7/16, G06g 7/20, G06g 7/22
[58] Field of Search ................ 235/192, 194, 193.5; 307/229; 328/160, 104, 154, 158; 340/172.5

[56] References Cited

UNITED STATES PATENTS

| | | | |
|---|---|---|---|
| 3,621,288 | 11/1971 | Brown | 328/104 X |
| 3,639,847 | 2/1972 | Remy et al. | 328/160 |
| 3,728,535 | 4/1973 | Dickman et al. | 235/194 |

*Primary Examiner*—Joseph F. Ruggiero
*Attorney, Agent, or Firm*—R. S. Sciascia; J. A. Cooke; Sol Sheinbein

[57] ABSTRACT

An analog multiplier for providing an output equal to the vector sum of two d.c. input voltages. The multiplier is multiplexed to provide the square of each input d.c. voltage and the square root of the sum of the two squared voltages.

9 Claims, 6 Drawing Figures

VECTOR SUMMER CIRCUIT USING TIME SHARING

BACKGROUND OF THE INVENTION

The present invention is related to analog multipliers and more specifically to time shared multiplier for generating the vector sum of two d.c. input signals.

Analog guidance computers require many special computational circuits. One such circuit is a vector summer which calculates the square root of the sum of the squares at two numbers. This function is usually accomplished using three analog multipliers and two operational amplifiers. Two multipliers would be utilized as squaring circuits and the third would be used as a square root circuit. It is well known that analog multipliers are costly, large and consume large amounts of power.

SUMMARY OF THE INVENTION

To perform the vector summing function of the square root of the sum of the squares of two numbers, only one multiplier, on a time shared basis, is utilized. The analog input signals are multiplexed into the multiplier and demultiplexed after having been multiplied. Timing circuits sequence the multiplier through the various operations, and sample and hold circuits are used to store the information between sampling times. The square root function is accomplished using the multiplier as a squaring circuit in the feedback loop of an integrator.

OBJECTS OF THE INVENTION

It is therefore an object of the present invention to provide a time shared analog multiplier.

Another object of the present invention is to provide a multiplier capable of providing outputs previously requiring three multipliers.

Yet another object of the present invention is to provide a multiplier to accept two d.c. input voltages and generate a third d.c. voltage equal to the vector sum of the two input voltages.

Still another object of the present invention is to provide time sharing techniques to analog components.

Another object of the present invention is to provide a multiplier of reduced cost, power consumption and size, and of increased accuracy.

BRIEF DESCRIPTION OF THE DRAWINGS

While the specification concludes with claims particularly pointing out and distinctly claiming the subject matter which is regarded as the invention, it is believed that the invention, the objects and features and advantages thereof will be better understood from the following description taken in conjunction with the accompanying drawings in which:

DESCRIPTION OF THE PREFERRED EMBODIMENT

Figure 1:
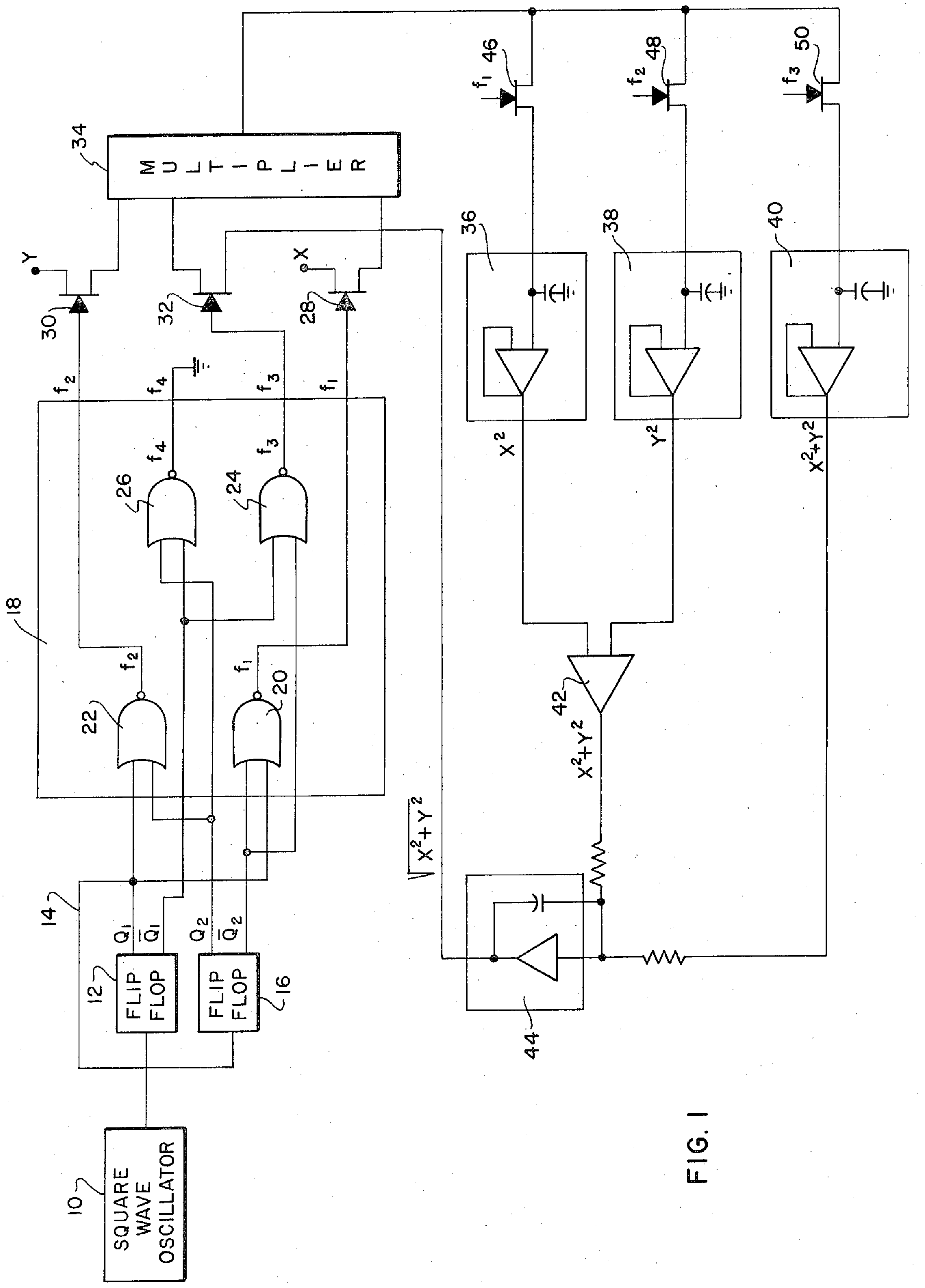
FIG. 1 is a schematic drawing in block diagram form of the preferred embodiment of the invention.
Figure 2A:
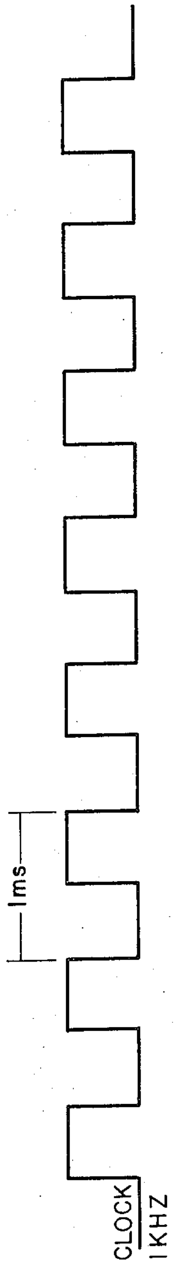
FIGS. 2A through 2E are a series of waveforms applied to multiplex the input analog signals to the multiplier.
Figure 2B:
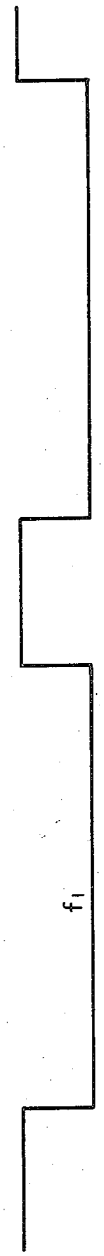
Figure 2C:
Figure 2D:
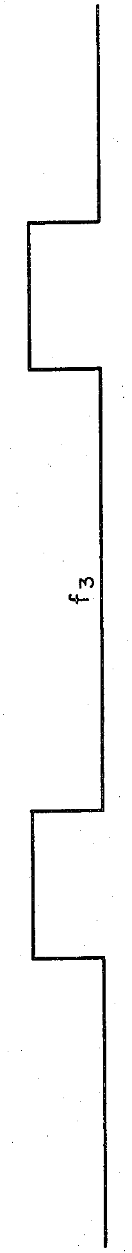
Figure 2E:
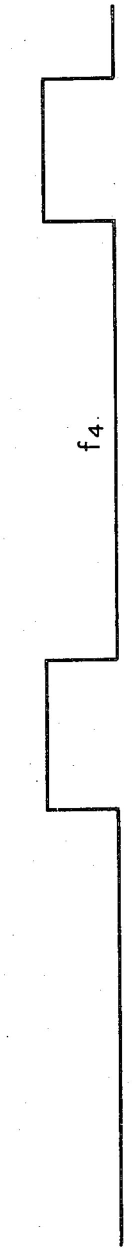

Referring to FIG. 1 a square wave oscillator 10 provides a base frequency that specifies the time base interval. Given this base time interval, the interval is divided into subintervals. In the example to be described hereinafter, the base frequency will be 1,000 Hz as shown in FIG. 2A, with four subintervals utilized, although it should be understood that any other base frequency and number of subintervals may be utilized. The four subintervals of 250 Hz each are generated by supplying the oscillator 10 output to drive a toggle flip flop 12 which acts as a frequency countdown circuit. The lower frequency signal $Q_1$, at 500 Hz, on terminal 14 drives a second flip flop count-down circuit 16 to provide a square wave signal $Q_2$ at one quarter the base frequency, i.e., 250 Hz. In addition to supplying signal $Q_1$, flip flop 12 supplies a signal $\bar{Q}_1$, inverse to $Q_1$, at the same frequency of 500 Hz. Similarly, flip flop 16 supplies a signal $\bar{Q}_2$. The four square wave signals $Q_1$, $\bar{Q}_1$ at 500 Hz, and $Q_2$, $\bar{Q}_2$ at 250 Hz are fed as the inputs to timing logic 18 which produces the four timing signals, $f_1, f_2, f_3$ and $f_4$ as shown in FIGS. 2B through 2E, respectively. Timing logic 18 is comprised of four NOR gates 20, 22, 24 and 26. NOR gate 20 receives as its input signals $Q_1$ and $\bar{Q}_2$, NOR gate 22 receives signals $Q_1$ and $Q_2$ as its inputs, NOR gate 24 receives signals $Q_1$ and $\bar{Q}_2$, and NOR gate 26 receives signals $\bar{Q}_1$ and $Q_2$ as its input. The base frequency is at 1 KHz as shown in FIG. 2A, and therefore, the base time interval is 1 millisecond. The timing logic 18 outputs are shown in FIGS. 2B through 2E as being on for one subinterval (one-fourth millisecond) and off for three subintervals (three-fourths millisecond) during each millisecond interval, with no two channels on at any interval concurrently, thereby preventing coupling between the channels. Inasmuch as only three operations are to be performed by the multiplier in this system, the fourth channel $f_4$ is considered a spare.

The three timing signals $f_1, f_2$ and $f_3$ (spare timing signal $f_4$ is grounded) are fed to field effect transistors 28, 30 and 32 respectively, to multiplex the inputs to analog multiplier 34, used as a squarer with the FET's used as analog switches. Coupled to the drain side of FET 28 is d.c. voltage X and coupled to the drain side of FET 30 is d.c. voltage Y. Thus, only when the timing pulses are on, do FET's 28, 30 or 32 produce an input signal to the multiplier 34, coupled to source side of the three FET's.

After being multiplied in multiplier 34 the output is fed to sample and hold circuits 36, 38 and 40 which are triggered to accept the multiplier output by timing pulses $f_1$, $f_2$, and $f_3$ on field effect transistors 46, 48 and 50 respectively. Sample and hold circuits 36, 38, 40 comprise a capacitor connected across the input of an operational amplifier used as a follower. The amplifier is used to provide a high impedance load to the capacitor and to provide a low impedance output. The capacitor charge time is small and the discharge time long compared to the base time interval of 1 millisecond. Increasing the base frequency of oscillator 10 enables the removal of the operational amplifier by shunting the capacitor by the input impedance of a summer circuit. The outputs of sample and hold 36, $X^2$, and sample and hold 38, $Y^2$, are summed in amplifier 42, and then compared in summing integrator 44 with the output of sample and hold circuit 40 containing the previous vector sum of these two squared voltages. The output of summing integrator 44, comprising an operational amplifier and capacitor is supplied to the drain side of field effect transistor 32 as its input. The integrator output will hold steady if its output equals the square root of the sum of the two squared input voltages, but if a difference exists between the output of sample and hold circuit 40 and the output of amplifier 42, integrator 44 will produce an output sufficient to drive the output voltage of sample and hold circuit 40 to the output voltage on amplifier 42.

In summary, it is felt that there has been described a time sharing system to be applied to analog components. Its use in complex guidance system reduces cost and digital lowers the power drain and improves accuracy. The substitution of COS/MOS type logic would reduce the power drain even further. The circuit accuracy can be improved by using the spare channel $f_4$ (FIG. 2E) to cancel the multiplier offset. The input to the spare channel is grounded and the output stored. This output voltage will be the multiplier offset which would be subtracted from the other three inputs. Doing this continuously would enable the circuit to track variations in the multiplier offset. Although a multiplier was used in the vector summer circuit, many other analog and digital circuits may be used in a time shared mode, as well as changing the operating mode of the multiplier to perform multiplications or divisions or the like.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed as new and desired to be secured by Letters Patent of the United States is:

1. A circuit for generating the vector sum signal of two d.c. inputs comprising:

an analog multiplier employed as a squarer;

means for multiplexing said multiplier with at least three input signals to provide at least three squared output signals;

means for demultiplexing said multiplied signals;

means for storing said demultiplexed signals;

means for intergrating said squared multiplexed signals for providing said vector sum signal.

2. A circuit as recited in claim 1 wherein said time multiplexing means comprises:

an oscillator for providing a base time interval;

at least two count down circuits comprising multivibrators coupled to said oscillator for subdividing said base time interval into four subintervals;

logic circuitry coupled to said multivibrators for producing at least three timing signals of equal duration with no timing signal concurrent with another;

at least three field effect transistors coupled between said logic circuitry and said multiplier, said field effect transistors receiving only one of said timing signals whereby said field effect transistor conducts to said multiplier only when said timing signal is on.

3. A circuit as recited in claim 2 wherein said demultiplexing means comprises at least three sample and hold circuits;

a field effect transistor coupled between each of said sample and hold circuit and said multiplier, said field effect transistors triggered to supply a voltage to its respective sample and hold circuit by said timing signal, only one timing signal coupled to each of said field effect transistor;

whereby each respective sample and hold circuit is enabled to receive only the square of the d.c. input voltage triggered be to multiplied.

4. A circuit as recited in claim 3 wherein said sample and hold circuit comprises an operational amplifier and capacitor.

5. A circuit recited in claim 3 wherein one d.c. input signal coupled to the first of said three field effect transistors is X volts, a second d.c. input signal coupled the second of said three field effect transistors is Y volts, one sample and hold circuit stores $X^2$ volts, a second sample and hold circuit stores $Y^2$ volts.

6. A circuit as recited in claim 5 further including amplifier means for adding said $X^2$ volts and $Y^2$ volts, and integrating means for obtaining the square root of the output of said amplifier means $X^2 + Y^2$.

7. A circuit as recited in claim 6 wherein the output of said integrating means is coupled to the third field effect transistor of said three field effect transistor whereby said output may be squared in said multiplier as the third of said three input signals and stored in the third sample and hold circuit whose output is coupled to said integrator for comparing its value with the new squared input voltages.

8. A circuit as recited in claim 7, wherein said base time interval is 1 millisecond, and each subinterval is one-fourth millisecond.

9. A circuit as recited in claim 7 wherein said integrating means comprises a summing integrator for driving the difference between the output of said amplifier means and the output of said third sample and hold circuit to zero.

* * * * *